United States Patent
Priewasser

(10) Patent No.: US 12,006,995 B2
(45) Date of Patent: Jun. 11, 2024

(54) SUSPENSION STRUT AND ABUTMENT ELEMENT

(71) Applicant: KTM AG, Mattighofen (AT)

(72) Inventor: Markus Priewasser, Schalchen (AT)

(73) Assignee: KTM AG, Mattighofen (AT)

( * ) Notice: Subject to any disclaimer, the term of this patent is extended or adjusted under 35 U.S.C. 154(b) by 501 days.

(21) Appl. No.: 17/343,283

(22) Filed: Jun. 9, 2021

(65) Prior Publication Data

US 2021/0388882 A1   Dec. 16, 2021

(30) Foreign Application Priority Data

Jun. 12, 2020   (AT) ............................... A 50512/2020

(51) Int. Cl.
| | |
|---|---|
| F16F 13/00 | (2006.01) |
| F16F 9/32 | (2006.01) |
| F16F 9/56 | (2006.01) |

(52) U.S. Cl.
CPC .... *F16F 13/007* (2013.01); *F16F 2224/0208* (2013.01); *F16F 2228/08* (2013.01); *F16F 2230/0005* (2013.01); *F16F 2232/08* (2013.01); *F16F 2234/02* (2013.01)

(58) Field of Classification Search
CPC ............ F16F 13/007; F16F 2224/0208; F16F 2230/0005; F16F 2234/02; F16F 9/56; F16F 1/12; F16F 9/32; F16F 9/121; F16F 9/3264; B60G 2204/1242; B60G 2204/61; B60G 15/063; F16B 39/30; F16B 39/38
See application file for complete search history.

(56) References Cited

U.S. PATENT DOCUMENTS

| | | | | |
|---|---|---|---|---|
| 4,830,395 A | * | 5/1989 | Foley ................. | B60G 17/0272 280/124.162 |
| 5,044,614 A | * | 9/1991 | Rau ...................... | B60G 17/021 267/221 |

(Continued)

FOREIGN PATENT DOCUMENTS

| | | |
|---|---|---|
| DE | 20 2005 013 316 | 12/2005 |
| DE | 10 2007 007 630 | 8/2008 |

(Continued)

*Primary Examiner* — Robert A. Siconolfi
*Assistant Examiner* — James K Hsiao
(74) *Attorney, Agent, or Firm* — Wenderoth, Lind & Ponack, L.L.P.

(57) ABSTRACT

A suspension strut includes a cylinder having a piston moveable in the cylinder, a coil spring arranged around the cylinder, and an abutment element for mounting the coil spring. The position of the abutment element is adjustably fixable along the longitudinal direction of the cylinder with respect to one direction, the cylinder has a male thread, and the abutment element has a female thread corresponding to the male thread. A thread insert is arranged in the abutment element, the thread insert has a holding region and an actuating region, and the region between the holding region and the actuating region can be arranged in the threads of the male thread of the cylinder. A holding means for the holding region is in the abutment element, the actuating region is mounted moveably in the abutment element, and the diameter of the thread insert is variable by movement of the actuating region.

33 Claims, 14 Drawing Sheets

(56) References Cited

U.S. PATENT DOCUMENTS

| | | | |
|---|---|---|---|
| 5,580,034 A * | 12/1996 | Cheng | F16F 9/003 |
| | | | 267/221 |
| 6,827,184 B1 * | 12/2004 | Lin | B60G 11/15 |
| | | | 267/221 |
| 7,237,780 B2 * | 7/2007 | Ohki | B60G 17/021 |
| | | | 280/124.165 |
| 7,293,764 B2 * | 11/2007 | Fang | B60G 17/021 |
| | | | 267/220 |
| 8,210,106 B2 * | 7/2012 | Tai | F16F 1/121 |
| | | | 105/456 |
| 8,516,914 B2 * | 8/2013 | Osterlanger | B62D 17/00 |
| | | | 188/266 |
| 8,573,573 B2 * | 11/2013 | Michel | B60G 15/068 |
| | | | 267/225 |
| 8,702,075 B1 * | 4/2014 | Moorefield | F16F 1/121 |
| | | | 267/221 |
| 8,844,943 B2 * | 9/2014 | Kim | B60G 99/002 |
| | | | 280/5.514 |
| 9,140,325 B2 * | 9/2015 | Cox | F16F 9/56 |
| 9,844,993 B2 * | 12/2017 | Botello | B60G 17/021 |
| 9,869,360 B2 * | 1/2018 | Smith | F16B 37/0892 |
| 9,914,335 B1 * | 3/2018 | Lin | B60G 17/021 |
| 10,247,253 B2 | 4/2019 | Schumann et al. | |
| 10,345,122 B2 * | 7/2019 | Gardynik | G01L 1/042 |
| 10,457,106 B2 * | 10/2019 | Wuebbolt-Gorbatenko | |
| | | | B60G 17/021 |
| 10,690,215 B2 * | 6/2020 | Sakka | B60G 13/14 |
| 11,261,902 B2 * | 3/2022 | Adams | F16B 35/06 |
| 2004/0232648 A1 * | 11/2004 | Ohki | B60G 15/02 |
| | | | 280/124.164 |
| 2008/0260491 A1 | 10/2008 | Soeda et al. | |
| 2010/0252972 A1 * | 10/2010 | Cox | F16F 1/121 |
| | | | 267/286 |
| 2010/0308518 A1 * | 12/2010 | Michel | F16F 1/121 |
| | | | 267/225 |
| 2011/0107859 A1 * | 5/2011 | Osterlanger | B60G 7/006 |
| | | | 74/89.37 |
| 2011/0176887 A1 * | 7/2011 | Im | F16B 39/38 |
| | | | 411/262 |
| 2014/0161560 A1 * | 6/2014 | Steffl | F16B 37/002 |
| | | | 411/432 |
| 2016/0221410 A1 * | 8/2016 | Mersmann | B60G 17/00 |
| 2016/0230814 A1 | 8/2016 | Schumann et al. | |
| 2020/0377168 A1 | 12/2020 | Kubotera | |
| 2023/0355379 A1 * | 11/2023 | Verine | A61F 2/2439 |

FOREIGN PATENT DOCUMENTS

| | | |
|---|---|---|
| DE | 10 2008 021 861 | 11/2009 |
| EP | 2 231 427 | 9/2010 |
| EP | 3 786 477 | 3/2021 |
| JP | 2007-71299 | 3/2007 |
| JP | 2007-218409 | 8/2007 |
| JP | 2011-149550 | 8/2011 |
| JP | 2013-199976 | 10/2013 |
| JP | 2016-142299 | 8/2016 |
| JP | 2019-60386 | 4/2019 |
| WO | 2005/121570 | 12/2005 |

* cited by examiner

A-A

C-C

SUSPENSION STRUT AND ABUTMENT ELEMENT

BACKGROUND OF THE INVENTION

The invention concerns a suspension strut for a vehicle, in particular for a motorcycle, including a cylinder having a piston moveable in the cylinder, a coil spring arranged at least partially around the cylinder, and an abutment element for mounting the coil spring. The position of the abutment element is adjustably fixable along the longitudinal direction of the cylinder at least with respect to a direction. The cylinder is at least region-wise provided with a male thread, and the abutment element is provided at least region-wise with a female thread corresponding to the male thread.

The invention further concerns a vehicle comprising such a suspension strut and an abutment element for mounting a coil spring which is arranged at least partially around a cylinder of a suspension strut as described above.

A suspension strut or suspension shock involves a combination of a hydraulic damper with a cylinder and a piston moveable in the cylinder and a coil spring, wherein the damper is arranged in the center of the coil spring. The coil spring is preloaded to adjust the spring action of the suspension strut. For that purpose the arrangement frequently uses an abutment element for the spring, that is provided with a female thread and is screwed on to the cylinder of the damper which for that purpose has a male thread, wherein the female thread of the abutment element corresponds to the male thread of the cylinder. To adjust the preload of the coil spring the position of the abutment element is altered along the longitudinal direction of the cylinder, by the abutment element being turned either in the one or the other direction of rotation and thus moved along the longitudinal direction of the cylinder by way of the connection between the male and female threads. A clamping ring which is fitted around the abutment element is frequently used to fix the position of the abutment element. The clamping ring is then fixed on the abutment element by means of a screw connection whereby the abutment element which is frequently in the form of a slit plastic sleeve is clamped fast on the cylinder. That clamping ring is a kind of clamping cuff.

That structure on the one hand suffers from the disadvantage of complicated handling as the clamping ring has to be subsequently fitted and fixed with a separate tool. In particular however there is the danger that the clamping ring is excessively tightened whereby the cylinder of the damper is easily indented in the region of the clamping ring. That results in a bottleneck constriction so that the piston moved in the cylinder can rub heavily against the inside wall of the cylinder and ultimately jam whereby the damper is destroyed.

SUMMARY OF THE INVENTION

The object of the present invention is to overcome the foregoing disadvantages and to provide a suspension strut in which the position of the abutment element can be more easily fixed at least in relation to one direction along the longitudinal direction of the cylinder of the damper without running the risk of damaging the damper when fixing the abutment element.

The suspension strut or shock according to the invention is installed in a vehicle, in particular a motorcycle, and can be used for the spring suspension of the front wheel or the front wheels but also for the spring suspension of the rear wheel or the rear wheels.

The suspension strut includes a damper having a piston moveable in the cylinder and a coil spring arranged at least partially around the cylinder. An abutment element which can be screwed on the cylinder is provided for mounting one end of the coil spring. For that purpose the cylinder is at least region-wise provided with a male thread and the abutment element at least region-wise has a female thread corresponding to the male thread. The abutment element therefore represents a spring tensioning ring. The other end of the coil spring is mounted to a second abutment element.

When the abutment element is rotated in such a way that the spacing relative to the second abutment element and therewith also the length of the coil spring is increased the spring is relieved of load, that is to say the preload becomes less. If, however, the spacing relative to the second abutment element and therewith also the length of the coil spring is reduced by rotating the abutment element in the other direction, then the preload is increased, in particular when used for the suspension of the rear wheel of motorcycles the preload is very greatly reduced for making a tyre change.

For fixing the position of the abutment element in relation to a direction along the longitudinal direction of the cylinder—that is to say the abutment element cannot be moved any further in that direction after fixing—the unit has a thread insert arranged in the abutment element. The thread insert has a holding region and an actuating region. The region between the holding region and the actuating region can be arranged in the threads of the male thread of the cylinder.

Provided in the abutment element is a holding means in which the holding region of the thread insert can be preferably releasably fixed. By the actuating region of the thread insert being mounted moveably in the abutment element, in which case the diameter of the thread insert is variable by a movement of the actuating region, then in a first position of the actuating region in which the diameter of the thread insert is increased the abutment element can be rotated and thus moved along the longitudinal direction of the cylinder while in a second position of the actuating region in which the diameter of the thread insert turns out to be smaller and the thread insert bears tightly in the threads of the male thread of the cylinder then as a consequence of the frictional force created thereby rotation of the abutment element is made impossible and thus the abutment element is fixed in position.

Preferably in that respect, the thread insert is resilient (i.e. spring elastic). The resilient effect in that respect refers to the movement of the actuating region and thus the variation in the diameter of the thread insert. In that case, the actuating region is moved against the spring force to increase the diameter of the thread insert while at the same time the holding region of the thread insert is held by the holding means. In that case, it is possible to provide a latching position for the actuating region so that the actuating region is prevented from moving of its own accord by virtue of the spring force back into the locking position, that is to say in that position in which the thread insert bears snugly against the male thread of the cylinder. As a result the operator does not have to hold the abutment element fast and has both hands free for working on the vehicle.

If then the actuating region is moved back in the direction of the locking position due to the spring force, for example because the actuating region is released from the latching position, the thread insert, by virtue of the spring force acting thereon, again snugly embraces the cylinder in the threads of the male region and thereby prevents further rotation of the abutment element. As fixing of the abutment element is implemented by the spring force of the thread insert excessive tightening of the abutment element and resulting damage to the piston is not possible.

Preferably, the holding region and/or the actuating region is in the form of a radially outwardly facing pin, thereby permitting on the one hand simple fixing of the holding region and on the other hand easy movement of the actuating region, especially as the inside of the abutment element is substantially round.

Preferably, the thread insert is in the form of a coil spring. In that case, the holding region and/or the actuating region is preferably in the form of a radially outwardly facing pin by one or both spring ends of the spring being bent outwardly. In that respect, the actuating region projects further outwardly than the holding region. In that case, the spring action of the coil spring is not limited to compression and extension of the spring in the longitudinal direction, but also extends to a rotational movement of the spring ends. If the spring end in the form of the actuating region is rotated, that is to say moved tangentially, while the other spring end in the form of the holding region is held fast, the diameter of the spring is increased against the spring force. When the actuating element is released, it is rotated back by the spring force, with the diameter of the spring decreasing.

In the case of a holding ring in the form of a outwardly pointing pin, the holding means can be in the form of a bore. By virtue of the holding region being disposed in that bore, the holding region is secured there. That provides a counteracting mounting for the thread insert for the movement of the actuating region, which is advantageous in particular in relation to a resilient thread insert.

In a preferred embodiment, the abutment element has a slot which is preferably arranged substantially parallel to the threads of the female thread, in which the actuating region of the thread insert is moveably mounted. The movement of the actuating region is limited by the two ends of the slot by virtue of the extent of the slot.

In an embodiment of the invention, the resilient thread insert is arranged in the abutment element in such a way that the actuating region presses against a first end of the slot by virtue of the spring action of the thread insert. The first end of the slot therefore delimits the movement of the actuating region, which occurs by virtue of the spring action. It is however also possible that the movement of the actuating region occurring by virtue of the spring action comes to a halt before the actuating region presses against the first end of the slot as the thread insert already bears snugly against the male thread before that position of the actuating region. If the movement of the actuating region occurring due to the spring action comes to a halt that involves an unloaded state of the thread insert, free from an external force acting thereon. Upon a movement of the actuating region in the direction of the other end of the slot in opposition to the spring action the diameter of the thread insert is increased.

By virtue of the spring action the thread insert which is preferably in the form of a coil spring automatically fits into the threads of the male thread if the actuating region is not moved against the spring action or is held in such a position for example by an unlocking element. The frictional force which occurs upon engagement of the thread insert in the threads prevents rotation of the abutment element connected to the thread insert by way of the holding region and the holding means. The diameter of the thread insert is increased by a movement of the actuating region in the direction of the other end of the slot so that it is no longer in engagement with the threads and does not exert any frictional force or now only exerts a reduced frictional force on the male thread. Rotation of the abutment element and thus displacement of the position along the longitudinal direction of the cylinder is thus possible.

If the slot is oriented substantially parallel to the threads of the female thread then in the locking position of the actuating region, when it presses against the first end of the slot or the movement of the actuating region, occurring due to the spring action, has come to a halt by virtue of the thread insert bearing against the male thread (in that case the actuating region can be disposed in the region of the first end of the slot) rotation of the abutment element in one direction is made impossible by virtue of the frictional force exerted on the male thread. The actuating region is in the locking position. Rotation of the abutment element in that direction of rotation which points from the other end of the slot to the first end of the slot is however possible. In that case, upon rotation of the abutment element, the holding region is moved therewith in such a way that the diameter of the thread insert is increased somewhat in that region (there is always a certain clearance here). That is continued by virtue of the friction between the thread insert and the male thread so that the diameter of the thread insert is overall increased and the frictional force exerted on the male thread is reduced. The rest of the thread insert including the actuating region is entrained with the holding region and rotation of the abutment element in that direction is overall possible. Rotation of the abutment element in the other direction of rotation however is not possible as in that situation the holding region would be moved in a direction so that the diameter of the thread insert would decrease still further whereby an even greater frictional force would be exerted on the male thread. As the block only concerns one direction of rotation the movement of the abutment element is fixed only with respect to one direction along the longitudinal direction of the cylinder.

If the actuating region moves away from the locking position, that is to say from the first end of the slot, that results in an increase in the diameter of the thread insert and this entails a reduction in the frictional force exerted on the male thread so that in that state the abutment element can be rotated even in that direction of rotation which faces from the first end of the slot to the other end thereof.

Movement of the actuating region can be effected, for example, by the provision of an unlocking element which is mounted rotatably on the abutment element and which on its inside has a groove into which the actuating region of the thread insert engages. The unlocking element can in that case be rotated independently of the abutment element. For that purpose the inside of the abutment element can be provided for example with a groove which is restricted in the longitudinal direction. As soon as the actuating region butts against the end of the longitudinal groove the actuating region is rotated jointly with the unlocking element and is thus moved tangentially.

In a preferred embodiment of the invention, a second thread insert is arranged in the abutment element. The second thread insert has a holding region and an actuating region, wherein the region between the holding region of the second thread insert and the actuating region of the second thread insert can be arranged in the threads of the male thread on the cylinder, like the above-described thread insert. Provided in the abutment element is a second holding means for the holding region of the second thread insert, wherein the actuating region of the second thread insert is mounted moveably in the abutment element, wherein the diameter of the second thread insert is variable by a movement of the actuating region of the second thread insert.

Preferably, the second thread insert is identical to the above-described thread insert. In particular, preferably the second thread insert is resilient. The spring action in that respect relates to the movement of the actuating region of the second thread insert and thus the variation in the diameter of the second thread insert. In that respect, the actuating region of the second thread insert is moved against the spring force for increasing the diameter of the second thread insert while at the same time the holding region of the second thread insert is held by the holding means of the second thread insert. In that case, there can be a latching position for the actuating region of the second thread insert so that the actuating region of the second thread insert is prevented from moving of its own accord by virtue of the spring force back into the locking position, that is to say into that position in which the thread insert bears snugly against the male thread of the cylinder.

When then the actuating region of the second thread insert moves back again under the spring force, for example because the actuating region is released from the latching position, then the second thread insert, by virtue of the acting spring force, again snugly embraces the cylinder in the threads of the outer thread region and thereby blocks further rotation of the abutment element. As fixing of the abutment element is implemented by the spring force of the second thread insert, excessive tightening of the abutment element and damage resulting therefrom to the piston is not possible.

Both for the actuating region of the thread insert and also for the actuating region of the second thread insert it is possible to provide a latching position for the locking position, additionally or alternatively to the latching position in which the actuating region is prevented from moving of its own accord back into the locking position by virtue of the spring force. That latching position in addition to the acting spring force prevents unintentional movement of the actuating region away from the locking position.

Preferably, the latching position for the actuating region of the thread insert and/or for the actuating region of the second thread insert is implemented both for the locking position and also for the opposite position by especially formed recesses and/or by latching elements in the unlocking element. In that respect, the actuating region of the thread insert and/or the actuating region of the second thread insert can for example engage into especially shaped recesses on the inside of the thread insert, in which case latching elements can additionally be provided for that purpose.

Additionally or alternatively to the latching position or positions for the actuating region of the thread insert and/or for the actuating region of the second thread insert, one or more latching positions can be provided for the holding region of the thread insert and/or the holding region of the second thread insert. That can be implemented for example in that, upon a movement of the actuating region by means of the unlocking element the holding region of the thread insert and/or the holding region of the second thread insert engage into especially shaped recesses on the inside of the unlocking element, which prevent movement of the unlocking element and therewith also the actuating region of the thread insert and/or the actuating region of the second thread insert and thus prevent the actuating region from moving back of its own accord under the spring force into the locking position. For that purpose, latching elements can also be provided, preferably arranged in the unlocking element.

As in the case of the above-described thread insert, preferably in relation to the second thread insert the holding region of the second thread insert and/or the actuating region of the second thread insert is in the form of a radially outwardly pointing pin, thereby permitting on the one hand simple fixing of the holding region of the second thread insert and on the other hand easy movement of the actuating region of the second thread insert.

Preferably, the second thread insert is also in the form of a coil spring, in which case the holding region of the second thread insert and/or the actuating region of the second thread insert is preferably in the form of a radially outwardly pointing pin by one or both ends of the spring being bent outwardly. In that case it can be provided that the actuating region of the second thread insert projects further outwardly than the holding region of the second thread insert. The spring action of the coil spring in that case is not restricted to compression and extension of the spring in the longitudinal direction but also extends to a rotary movement of the spring ends. If the spring end in the form of the actuating region of the second thread insert is rotated, that is to say moved tangentially, while the other spring end which is in the form of the holding region of the second thread insert is held fast, the diameter of the spring is increased against the spring force. When the actuating region of the second thread insert is released then it rotates back under the spring force, with the diameter of the spring decreasing.

Preferably, in the abutment element is a second slot which is preferably arranged substantially parallel to the threads of the female thread and in which the actuating region of the second thread insert is moveably mounted. The second holding means can be in the form of a bore in which the holding region of the second thread insert can be fixed. It can also be provided that the first holding means and the second holding means are the same, that is to say one holding means serves for fixing both the holding region of the thread insert and also the holding region of the second thread insert.

The thread insert and the second thread insert can be in the form of a single component, for example by the first and second holding regions blending into each other or by the first and second holding regions being the same. The thread insert and the second thread insert have a common holding region held by a common holding means. For that purpose, for example, an outwardly projecting pin can simultaneously serve as the first and second holding regions arranged in a recess serving as a common holding means.

In an embodiment of the invention, the resilient second thread insert is arranged in the abutment element in such a way that the actuating region of the second thread insert, by virtue of the spring action of the second thread insert presses against a first end of the second slot. The first end of the second slot therefore limits the movement, occurring under the spring action, of the actuating region of the second thread insert. It is however also possible that the movement of the actuating region of the second thread insert, occurring due to the spring action of the second thread insert, comes to a halt before the actuating region of the second thread insert presses against the first end of the second slot as the second thread insert already bears snugly against the male thread before that position of the actuating region. If the movement of the actuating region of the second thread insert, occurring under the spring action, comes to a halt, this involves an unloaded state of the second thread insert, free from the application of an external force. Upon a movement of the actuating element of the second thread insert in the direction of the other end of the second slot against the spring action the diameter of the second thread insert is increased.

By virtue of the spring action the second thread insert which is preferably in the form of a coil spring automatically fits into the threads of the male thread if the actuating region of the second thread insert does not move against the spring action or is held in such a position for example by an unlocking element. The frictional force occurring upon engagement of the second thread insert into the threads prevents rotation of the abutment element which is connected to the second thread insert by way of the holding region of the second thread insert and the second holding means. The diameter of the second thread insert is increased by a movement of the actuating region of the second thread insert in the direction of the other end of the second slot, so that it is no longer in engagement with the threads and no frictional force or now only a reduced frictional force is exerted on the male thread. Rotation of the abutment element and thus adjustment of the position along the longitudinal direction of the cylinder is thus possible.

If the second slot is oriented substantially parallel to the threads of the female thread then in the first position of the actuating region of the second thread insert, when it presses against the first end of the second slot, or the movement of the actuating region of the second thread insert, occurring due to the spring action, has come to a halt by virtue of the second thread insert bearing against the male thread (in that case the actuating region of the second thread insert can be arranged in the region of the first end of the second slot) the rotation of the abutment element is made impossible in a direction by virtue of the frictional force exerted on the male thread. The actuating region of the second thread insert is in the locking position. Rotation of the abutment element in that direction of rotation which faces from the other end of the second slot to the first end of the second slot is however possible. In that situation, upon rotation of the abutment element the second holding region is entrained therewith in such a way that the diameter of the second thread insert is enlarged somewhat in that region (there is always a certain clearance here). That is continued by virtue of the friction between the thread insert and the male thread so that the diameter of the thread insert is overall increased and the frictional force exerted on the male thread is reduced. The rest of the second thread insert including the actuating region of the second thread insert is entrained with the second holding region and rotation of the abutment element is overall possible. Rotation of the abutment element in the other direction of rotation however is not possible as in that case the second holding region would be moved in a direction so that the diameter of the second thread insert would be still further reduced, whereby a greater frictional force would be exerted on the male thread. As the block only involves one direction of rotation the movement of the abutment element is fixed only in relation to one direction along the longitudinal direction of the cylinder.

If the actuating region of the second thread insert is moved away from the locking position, that is to say the first end of the second slot, that results in an increase in the diameter of the second thread insert and entailed therewith a reduction in the frictional force exerted on the male thread so that in that state the abutment element can also be rotated in that direction of rotation which faces from the first end of the second slot to the other end of the second slot.

Preferably, the direction in which the actuating region of the second thread insert is moveable to increase the diameter of the second thread insert is different from the direction in which the actuating region of the thread insert is moveable to increase the diameter of the thread insert. With such an arrangement of the thread insert and the second thread insert they act in equal and opposite relationship so that rotation of the abutment element in both directions is impossible if the first actuating region and the actuating region of the second thread insert are both in the locking position, therefore for example in the region of or at the respective first end of the slot and the second slot. The abutment element according to the invention thus serves as a spring clamping ring which is self-securing in both directions of rotation.

To move the actuating region of the second thread insert the above-described unlocking element which is mounted rotatably on the abutment element can have on its inside a second groove into which the actuating region of the second thread insert engages.

A movement of the actuating region of the thread insert permits rotation of the abutment element in a first direction of rotation. If on the other hand the actuating region of the second thread insert is moved then rotation of the abutment element in the other direction is possible. The operator can therefore decide whether he wants to permit a first direction of rotation and thus a movement of the abutment element in a first direction along the longitudinal direction of the cylinder. In that case the respective actuating region is to be moved away from the locking position, that is to say from the first end of the respective slot. If on the other hand the abutment element is to be moved in the other direction along the longitudinal direction of the cylinder then the other actuating region has to be moved at the other slot away from the locking position, that is to say from the first end.

The slot and the second slot can be axially spaced from each other. In that case, the slot and the second slot differ only in relation to the position along the longitudinal direction of the abutment element, that is to say the second slot is arranged above or below the slot in the axial direction and is of the same dimension. Preferably, in that case the first end of the slot is arranged in opposite relationship to the first end of the second slot. As a result, the thread insert and the second thread insert act in equal and opposite relationship.

The holding means and/or the second holding means can be arranged in the axial direction between the slot and the second slot.

Preferably, the inside of the abutment element, in which the cylinder is arranged, is free from a female thread in that region in which the thread insert and/or the second thread insert is arranged. As a result there is sufficient space for the increase in the diameter of the thread insert and/or the diameter of the second thread insert in order to bring same out of engagement with the threads of the male thread and to permit rotation of the abutment element. Alternatively it would also be possible for the abutment element to admittedly be provided with a female thread in that region in which the thread insert and/or the second thread insert is arranged, but to be of a larger inside diameter than in that region or those regions in which there is a female thread which is in engagement with the male thread on the cylinder. In that way also there is room for the increase in the diameter of the thread insert and/or the diameter of the second thread insert. The female thread in the region with a larger inside diameter can serve for the arrangement of the thread insert and/or the second thread insert.

In that respect, above the region without the female thread and/or below the region without the female thread the abutment element can be provided with a female thread corresponding to the male thread of the cylinder. If there is a female thread above and below, then one region with a female thread can be of a greater extent in an axial respect than the other one. The region involving the greater axial extent then serves essentially for fixing the abutment element while the other region serves for example above all to provide sealing integrity.

A further embodiment of the invention provides that arranged between the abutment element and the coil spring is a preferably metallic abutment ring. That abutment ring can be fixed to the abutment element or can also bear loosely against the abutment element. The abutment ring can be connected directly to the coil spring. Particularly when a metallic abutment ring is used it is possible for the abutment element to be made from plastic. The thread insert and/or the second thread insert are preferably metallic, for example spring steel.

BRIEF DESCRIPTION OF THE DRAWINGS

Further advantages and details of the invention are discussed hereinafter for various embodiments by way of example with reference to the following Figures in which.

DETAILED DESCRIPTION OF THE INVENTION

Figure 1A:
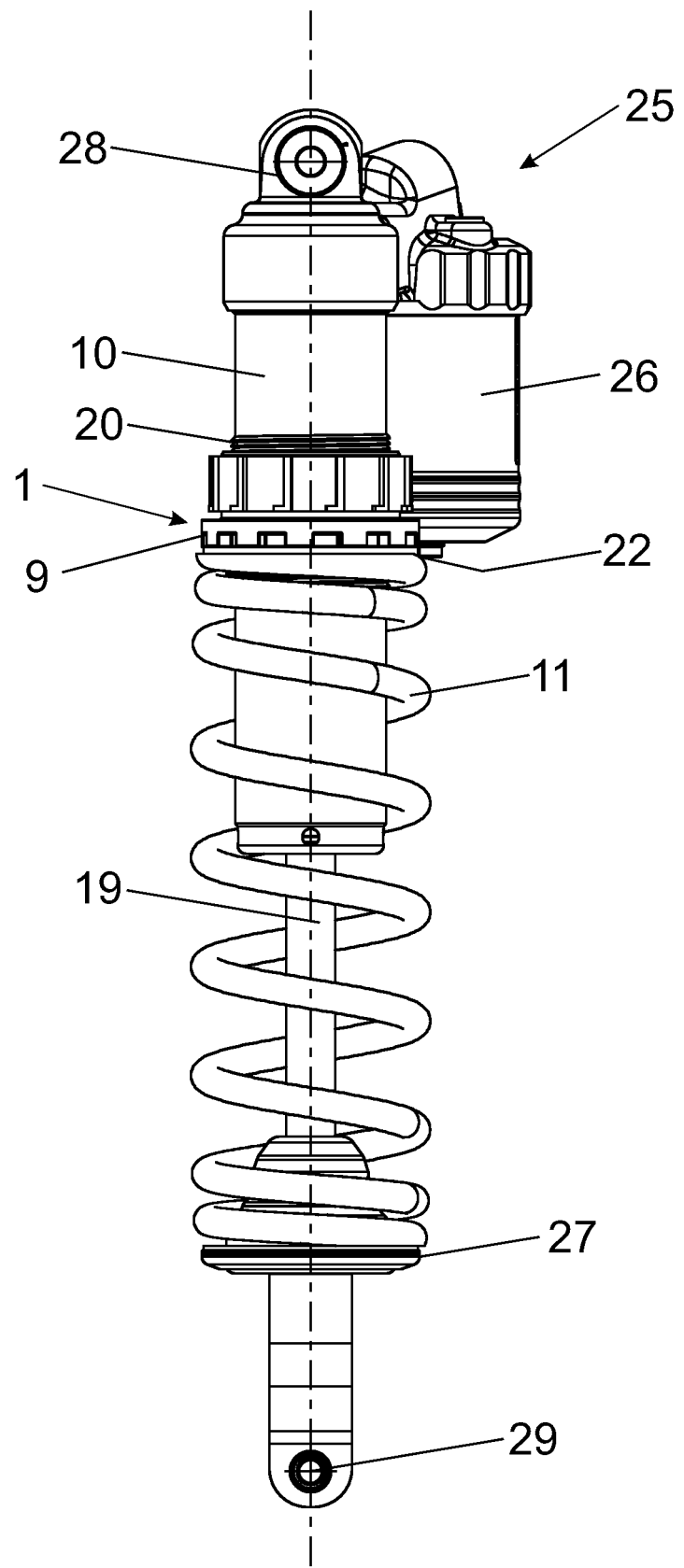
FIGS. 1a-1c show a side view and a cross-sectional view of a suspension strut according to the invention and a diagrammatic view of a motorcycle having a suspension strut according to the invention.

FIG. 1a shows a side view of a suspension strut or shock 25 for the suspension springing and damping of the movements of the rear wheel of a motorcycle 32. An example of a motorcycle 32 with incorporated suspension strut 25 is shown in FIG. 1.

The suspension strut 25 is connected to the motorcycle 32 by way of mountings 28, 29. The suspension strut 25 has a coil spring 11 which is mounted between an abutment element 1 having an abutment ring 22 at its first end and a second abutment element 27 at its other end. The suspension strut 25 further has a damper for damping the spring movement, which includes a cylinder 10 and a piston 19 moveable in the cylinder 10. A container 26 serves to store the damper medium.

While the position of the second abutment element 27 is fixed the preload of the coil spring 11 can be adjusted by a variation in the position of the abutment element 1 along the longitudinal direction L of the cylinder 10. If the coil spring 11 is compressed and thus more heavily preloaded that gives a chassis which is set for a harder ride. If the length of the coil spring 11 is extended and thus the preload is reduced that gives a chassis tuned for a softer ride.

Figure 1B:
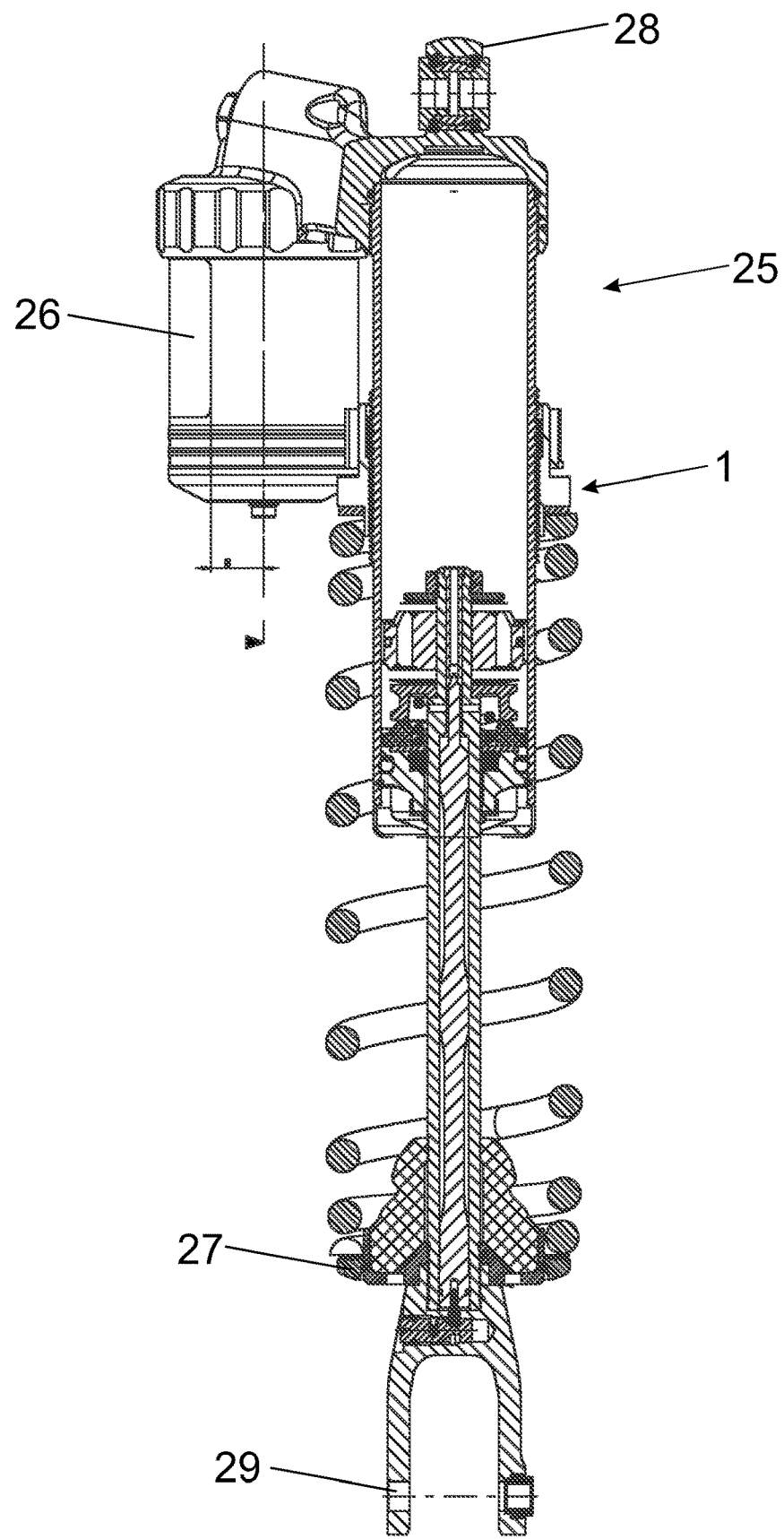
Figure 1C:
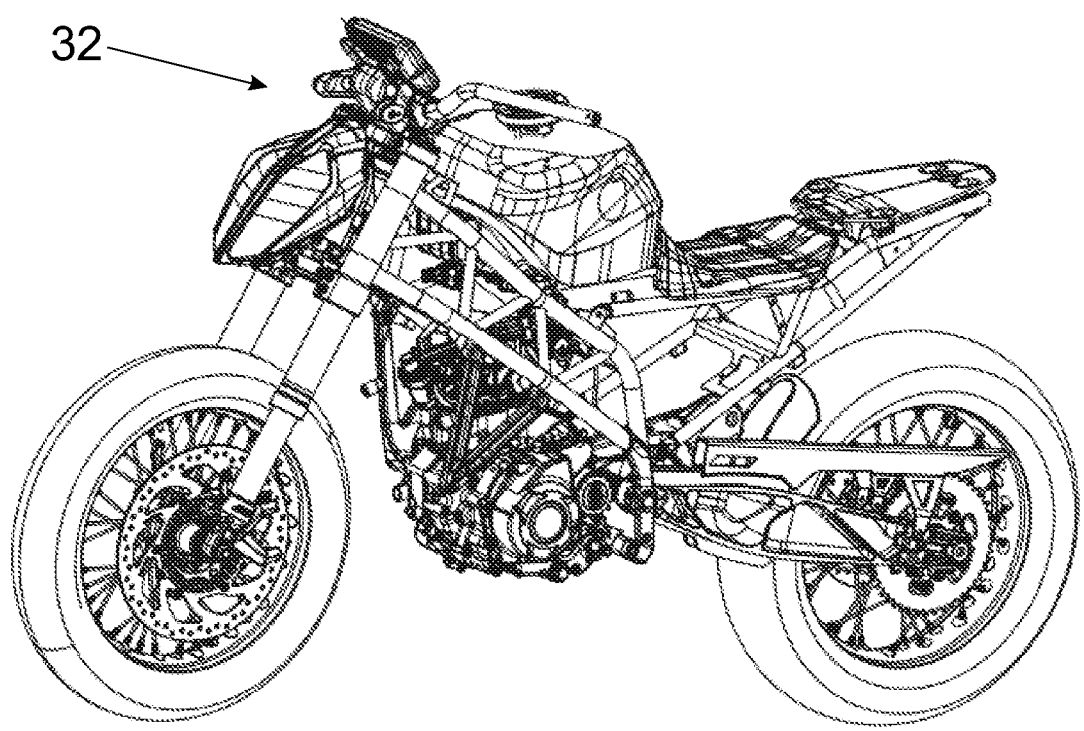

FIG. 1b shows the suspension strut 25 of FIG. 1a in a cross-sectional view. It can be seen there how the piston 19 is moveable in the cylinder 10. The mode of operation of the damper, apart from the mode of operation of the abutment element 1, is known per se in the state of the art.

Figure 2:
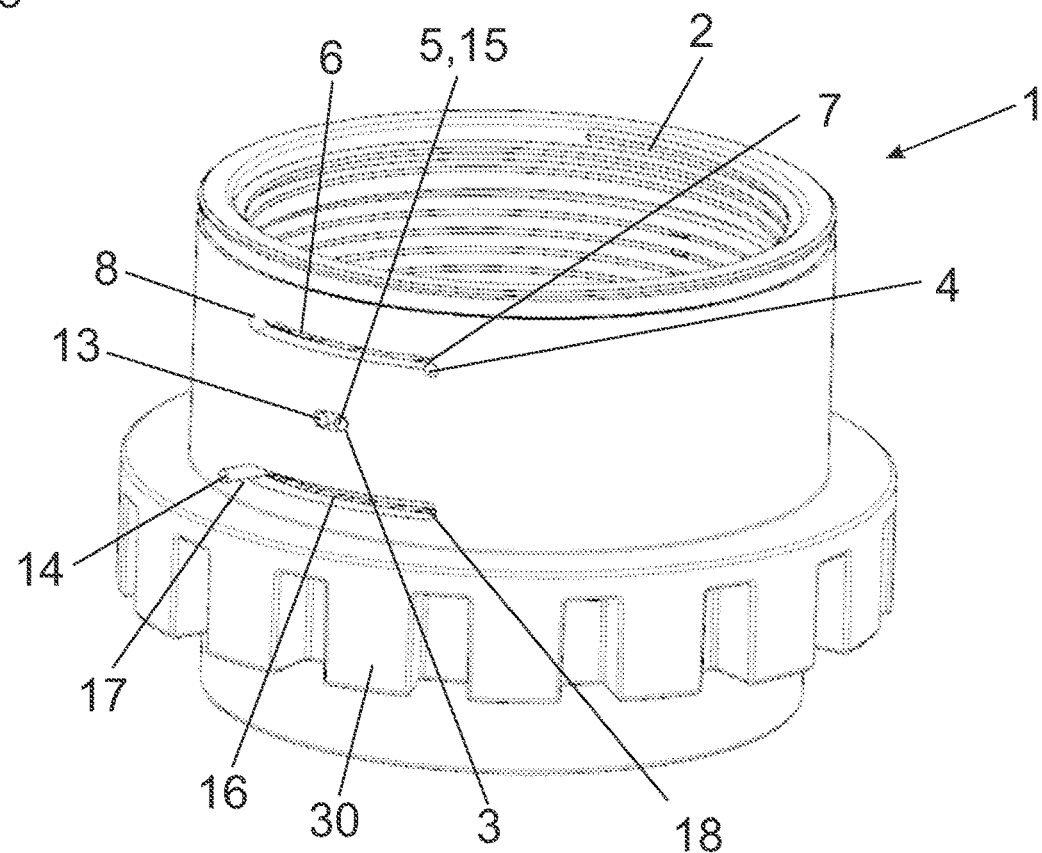
FIG. 2 shows a perspective view of an abutment element according to the invention.

FIG. 2 shows a perspective view of an abutment element 1 according to the invention. The abutment element 1 has a thread insert 2 arranged beneath a first region with a female thread 21 in the abutment element 1. The region 31 in which the thread insert is arranged is free from a female thread. The thread insert 2 is in the form of a coil spring, with both spring ends being bent radially outwardly. The upper spring end in this view is bent further outwardly and represents the actuating region 4. The other spring end represents the holding region 3 and is fixed at a holding means 5 in the form of a bore. By virtue of the spring action the actuating region 4 in the locking position presses against a first end 7 of the slot 6. The slot 6 like the second slot 16 is arranged substantially parallel to the turns of the thread insert 2 and thus substantially parallel to the thread flights of the female thread 21. As the thread insert 2 can be arranged in the threads of the male thread 20 arranged on the cylinder 10 the slots 6 and 16 are also arranged substantially parallel to the threads of the male thread 20.

The actuating region 4 is mounted moveably in the slot 6, wherein the diameter of the thread insert 2 is increased by a movement of the actuating region 4 in the direction of the other end 8 of the slot 6 and thus in opposition to the spring force of the thread insert 2, whereby the thread insert 2 comes out of engagement with the threads of the male thread 20 or the frictional force acting is at least markedly reduced.

Arranged beneath the thread insert 2 is a second thread insert 12 which is of the same configuration as the thread insert 2. It will be noted however that in this view the actuating region 14 of the second thread insert 12 is arranged beneath the holding region 13 of the second thread insert 12. The second thread insert 12 is thus arranged in the abutment element 1 inverted in comparison with the thread insert 2. The second holding means 15 in which the holding region 13 of the second thread insert 12 is arranged corresponds to the holding means 5, that is to say both holding regions 3, 13 are fixed in the same holding means disposed between the slot 6 and the second slot 16.

By virtue of the reversed arrangement the second thread insert 12 in the form of a coil spring acts in opposition to the thread insert 1 in the form of the coil spring. Accordingly the first end 17 of the second slot 16, against which the actuating region 14 of the second thread insert 12 presses in the locking position by virtue of the spring force, is arranged on the side illustrated on the left of the second slot 16 while the first end 7 of the slot 6 is arranged on the side shown on the right of the slot 6.

If the actuating region 14 of the second thread insert 12 is moved towards the right in the direction of the other end 18 of the second slot 16 the diameter of the second thread insert 12 increases in opposition to the spring force. The region 31 of the abutment element 1 is available for the increase in the diameter of the thread insert 2 and the second thread insert 12 by no female thread 21 being provided. Disposed on the outside of the abutment element 1 is a rotary region 30 provided for rotation of the abutment element 1. For that purpose the rotary region 30 has raised portions and recesses to which a suitable tool can be fitted.

Figure 3:
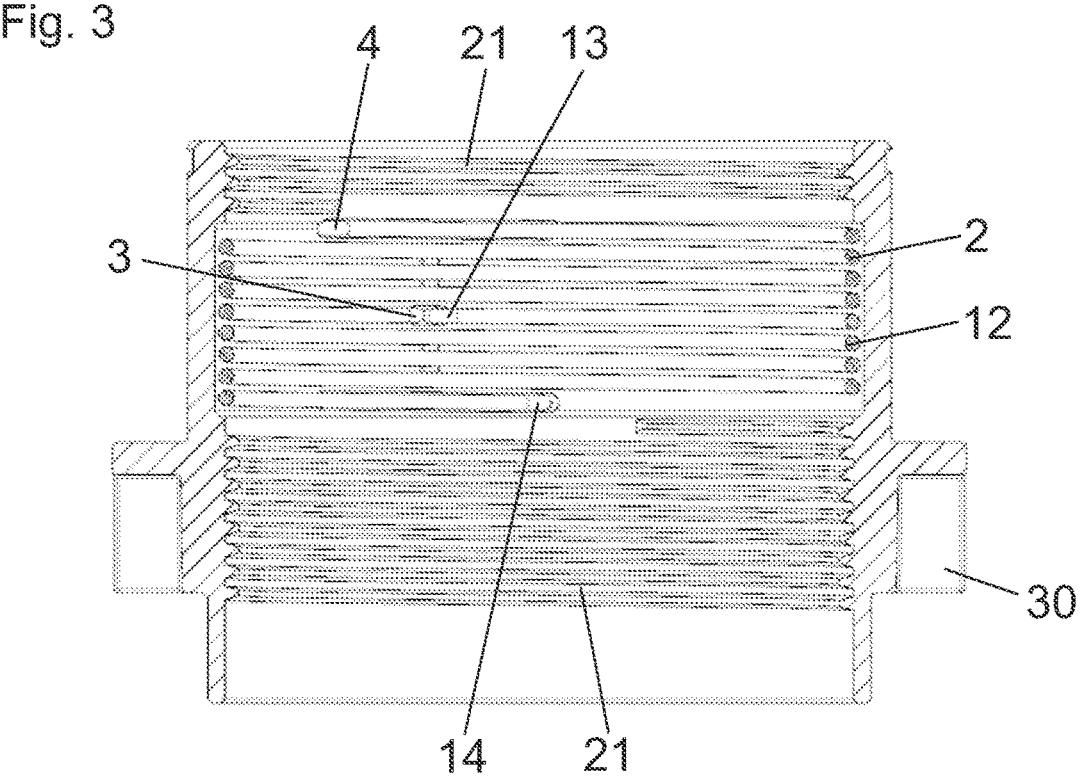
FIG. 3 shows a cross-sectional view of an abutment element according to the invention.

FIG. 3 shows a cross-sectional view of the abutment element 1 of FIG. 2. The region 31 which is free from a female thread 21 can be clearly seen there. The thread insert 2 and the second thread insert 12 are arranged in the region 31. Above the thread insert 2 the inside of the abutment element 1 is provided with a first region with a female thread 21. That region however is only of a short axial extent and serves in particular to prevent dirt from passing into the abutment element 1 when it is arranged on the male thread 20 of the cylinder 10. A larger region with a female thread 21 is provided below the second thread insert 12. The female thread 21 corresponds to the male thread 20. In the screwed-on state the forces acting on the coil spring 11 are transmitted by way of the connection between the female thread 21 and the male thread 20 to the cylinder 10 and thus to the damper.

Figure 4:
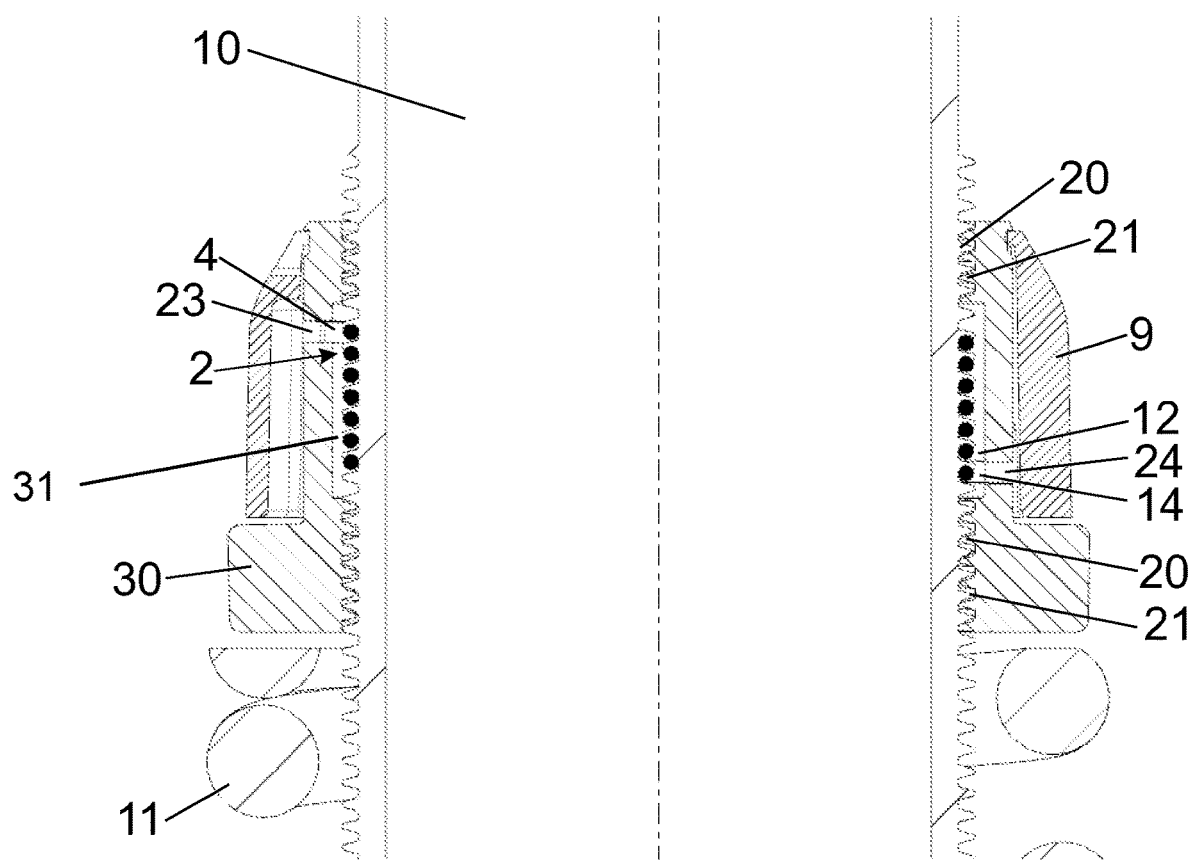
FIG. 4 shows a detail view relating to the cross-sectional view of a suspension strut according to the invention.

FIG. 4 shows a cross-sectional view illustrating the abutment element 1 in the mounted state. This involves a detail view of the cross-sectional view in FIG. 1b. It is possible to see the connection between the female thread 21 of the abutment element 1 and the male thread 20 of the cylinder 10, whereby the forces acting on the coil spring 11 while travelling are transmitted to the cylinder 10. The lower region of the female thread 21 serves in particular for that purpose. A further region having a female thread 21 is provided at the upper end of the abutment element 1. That region serves primarily to protect the interior of the abutment element 1 from contamination and soiling. In the region 31 the abutment element 1 is free from a female thread on its inside. That region serves to permit the increase in the diameter of the thread inserts 2, 12. In the illustrated state the thread inserts 2, 12 which are in the form of coil springs are in engagement with the threads forming the male thread 20. Unintentional rotation of the abutment element 1 and thus a displacement in the position thereof along the longitudinal direction L of the cylinder 10 is not possible. To move the actuating regions 4, 14 there is an unlocking element 9 which is mounted rotatably on the abutment element 1 and which has a first groove 23 and a second groove 24 into which the actuating regions 4, 14 engage.

The upper thread insert 2 prevents rotation of the abutment element 1 in the clockwise direction (in the direction of viewing on to the upper opening of the abutment element 1). Rotation in the anti-clockwise direction however is possible as in that case the thread insert 2 is entrained by the holding region 3. The thread insert 2 therefore prevents rotation of the abutment element 1 only in relation to one direction of rotation. In regard to the male thread 20 which is in the form of a right-handed thread the thread insert 2 secures against a movement of the abutment element 1 downwardly and thus an increase in the preload of the coil spring 21 when it bears against the abutment element 1 beneath the rotary region 30.

In comparison the second thread insert 12 secures against movement of the abutment element 1 upwardly and thus against a reduction in the preload insofar as the coil spring 11 bears against the abutment element 1 beneath the rotary region 30 and the male thread 20 is in the form of a right-handed thread. In the direction of viewing on to the upper opening of the abutment element 1 (as shown in FIG. 2) the second thread insert 12 more specifically prevents rotation of the abutment element 1 in the anti-clockwise direction. Rotation in the clockwise direction however is possible because here the second thread insert 12 is entrained by the second holding region 13.

The thread inserts 2, 12 together, when both actuating regions 4, 14 are in their locking position, render impossible rotation of the abutment element 1 in relation to both directions of rotation and thus generally prevent adjustment of the position of the abutment element 1 in relation to the longitudinal direction L of the cylinder 10. Accordingly the abutment element 1 is a self-securing spring locking ring, wherein the securing force is predetermined by the spring force of the thread inserts 2, 12 and tightening which is too much or too little is not possible. To permit adjustment of the position of the abutment element 1 in the one direction or the other along the longitudinal direction L of the cylinder 10 it is necessary selectively either for the actuating region 4 of the thread insert 2 to be moved in the direction of the other end 8 of the slot 6 or for the actuating region 14 of the second thread insert 12 to be moved in the direction of the other end 18 of the second slot 16.

Figure 5:
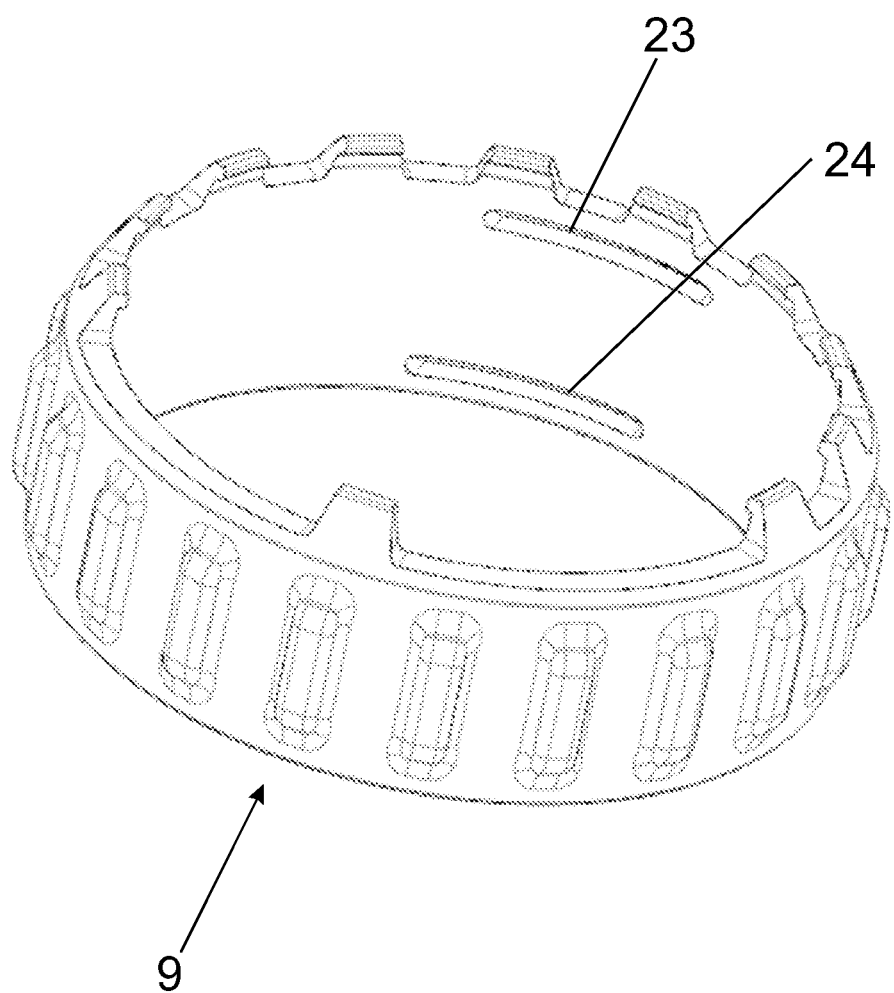
FIG. 5 shows a perspective view of an unlocking element.

FIG. 5 shows a perspective view of the unlocking element 9 mounted rotatably to the abutment element 1. For easier rotation a series of raised portions are arranged on the outside of the unlocking element 9. Disposed on the inside is a first groove 23 into which the actuating region 4 of the thread insert 2 engages. A second groove 24 serves for engagement of the actuating region 14 of the second thread insert 12. The first groove 23 and the second groove 24 are restricted in their longitudinal directions. When therefore the unlocking element 9 is rotated until the actuating region 4 butts against an end of the first groove 23, upon further rotation of the unlocking element 9 the actuating region 4 is also moved therewith. The same applies to the actuating region 14 of the second thread insert 12 when it butts against an end of the second groove 24. Depending on the respective direction of rotation of the unlocking element 9 therefore the actuating region 4 is moved in the direction of the other end 8 of the slot 6 or the actuating region 14 of the second thread insert 12 is moved in the direction of the other end 18 of the second slot 16. In that way the securing action can be released in relation to the one direction of rotation or the other of the abutment element 1.

Figure 6A:
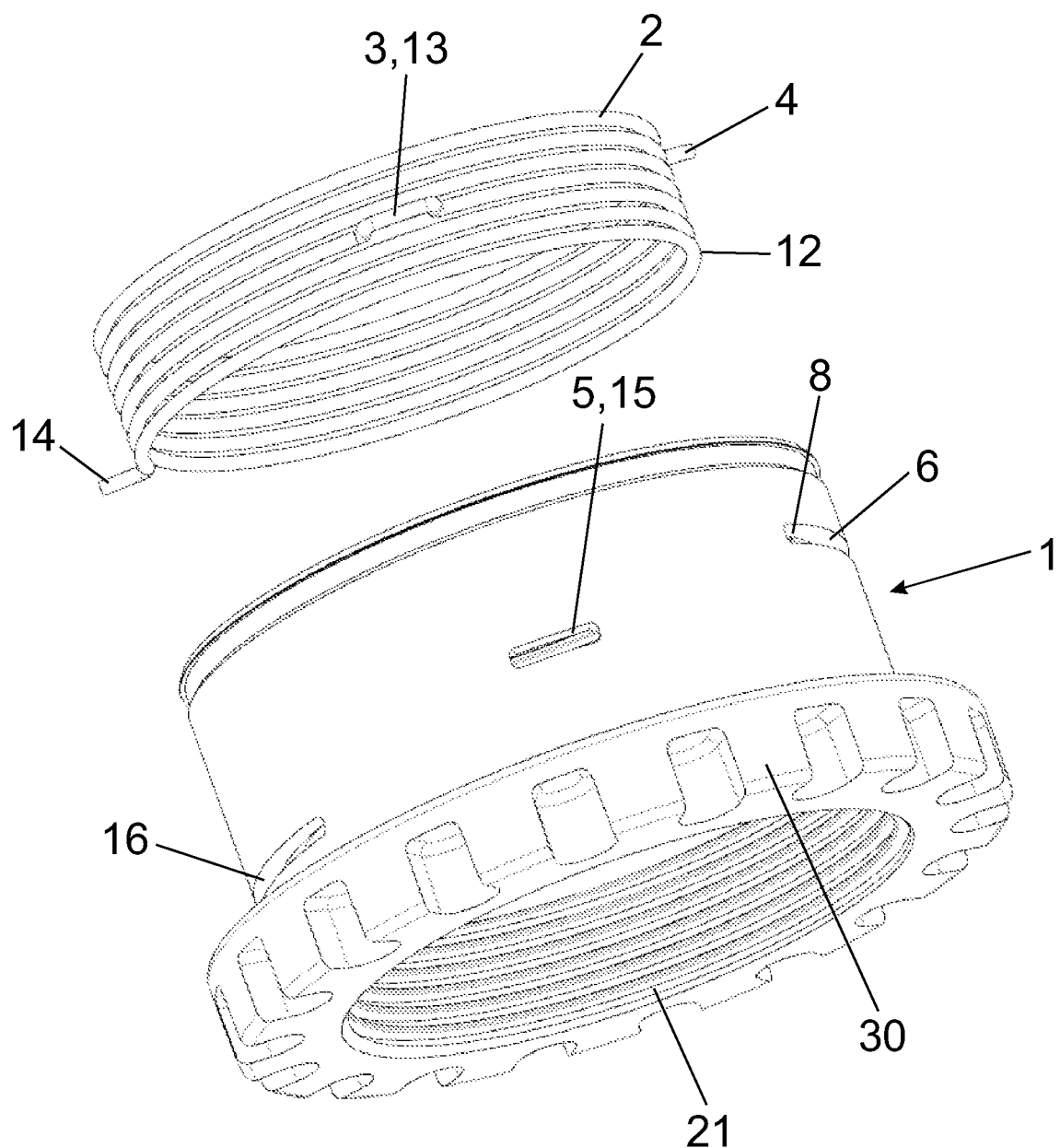
FIGS. 6a-6e show an exploded view, a perspective view and side views of a further embodiment of an abutment element according to the invention.

FIG. 6a shows an exploded view of an abutment element 1 and the thread inserts 2, 12 to be arranged in the abutment element 1. In this embodiment of the invention the thread insert 2 and the second thread insert 12 are in the form of a single thread insert, wherein the holding regions 3, 13 merge into each other and provide a single holding region which is arranged in a holding means 5, 15 in the abutment element 1. The holding means 5 and the second holding means 15 are therefore identical and are in the form of a common holding means. It is further possible to see the female thread 21 in which the thread inserts 2, 12 are arranged as well as the slot 6 and the second slot 16 in which the actuating region 4 and the second actuating region 14 are displaceably mounted.

Figure 6B:
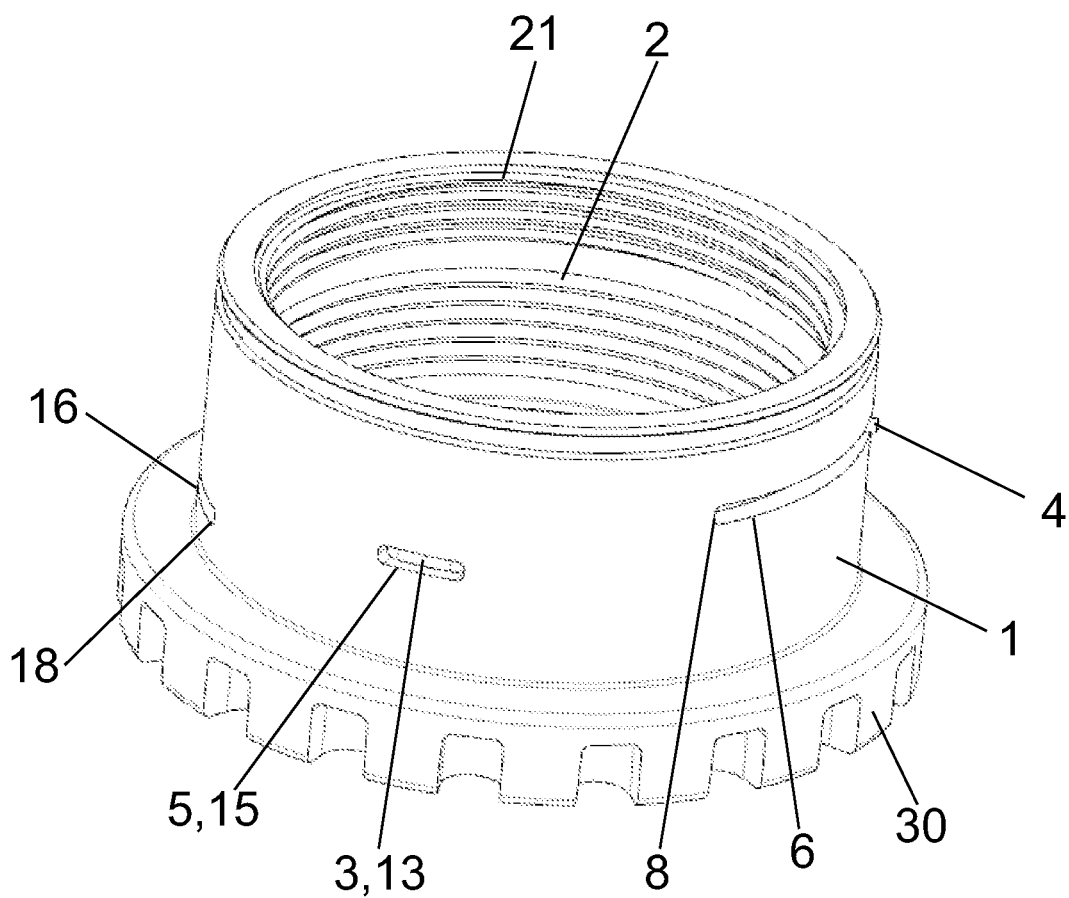

FIG. 6b shows a perspective view of an abutment element 1 as shown in FIG. 6a, in which the thread inserts 2, 12 as shown in FIG. 6a are arranged in the abutment element 1. It is possible to see that a further region with a female thread 21 is provided in the upper region of the abutment element 1. That further region serves primarily for providing a sealing action in relation to dirt. The common holding region 3, 13 is arranged in the common holding means 5, 15. The actuating region 4 is arranged displaceably in the slot 6, wherein the actuating region 4 in this position is arranged in the region of the free end 7. The second actuating region 14 is arranged displaceably in the second slot 16, with the actuating region 14 being disposed in the region of the first end 17 of the second slot 16.

Figure 6C:
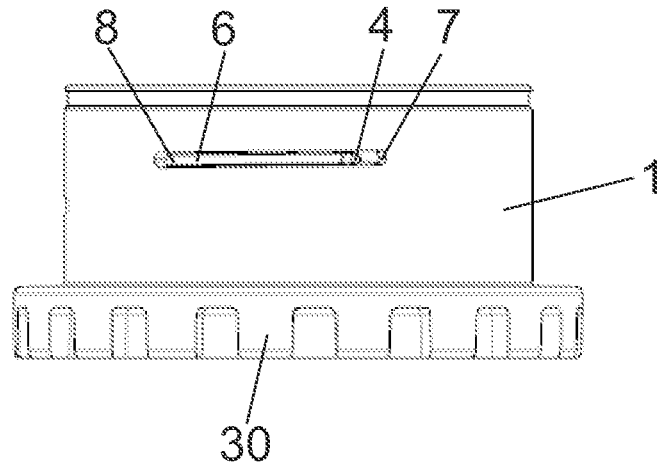
Figure 6D:
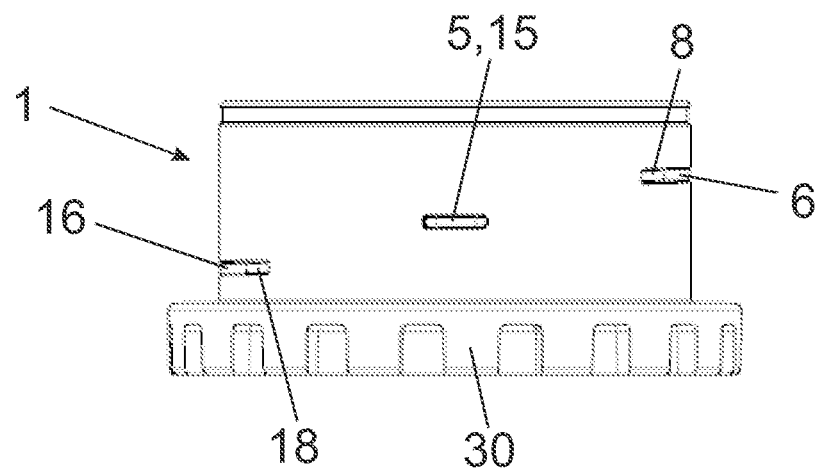
Figure 6E:
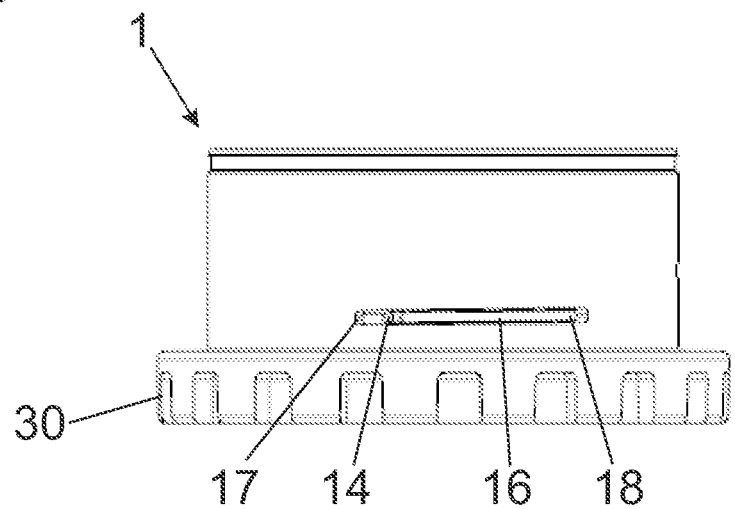

FIGS. 6c to 6e show side views of the abutment element 1 shown in FIG. 6b. In this respect is possible to see from FIG. 6c that the actuating region 4 is arranged in the slot 6 in the region of the first end 7. That is the locking position of the actuating region 4. The movement of the actuating region 4 by virtue of the spring action of the thread insert 2 has stopped in this embodiment before the actuating region 4 bears against the first end 7. The thread insert 2 exerts a high frictional force on the male thread 20 and prevents rotation of the abutment element 1 in the clockwise direction (when viewing from above, that is to say on to the side of the abutment element 1, that is opposite to the rotary region 30).

FIG. 6d shows in particular the recess which serves as a common holding means 5, 15 for the common holding region 3, 13 of the thread insert 2 and the second thread insert 12. It is further possible to see the second end 8 of the slot 6 and the second end 18 of the second slot 16. The second end 8 and the second end 18 are thus on opposite sides of the respective slot.

It can be seen from FIG. 6e that the actuating region 14 of the second thread insert 12 is arranged in the region of the first end 17 of the second slot 16. That is the locking position of the actuating region 14 of the second thread insert 12. As in the case of the thread insert 2 the movement, caused by the spring force, of the actuating region 14 of the second thread insert 12 has come to a halt before the actuating region 14 bears against the first end 17 of the second slot 16. By virtue of the friction force involved the second thread insert 12 prevents rotation in the anti-clockwise direction, once again when viewed from above—that is to say viewing on to the side of the abutment element, that is opposite to the rotary region 30. In all both actuating regions 4, 14 are in the locking positions so that rotation of the abutment element is prevented in both directions of rotation.

Figure 7A:
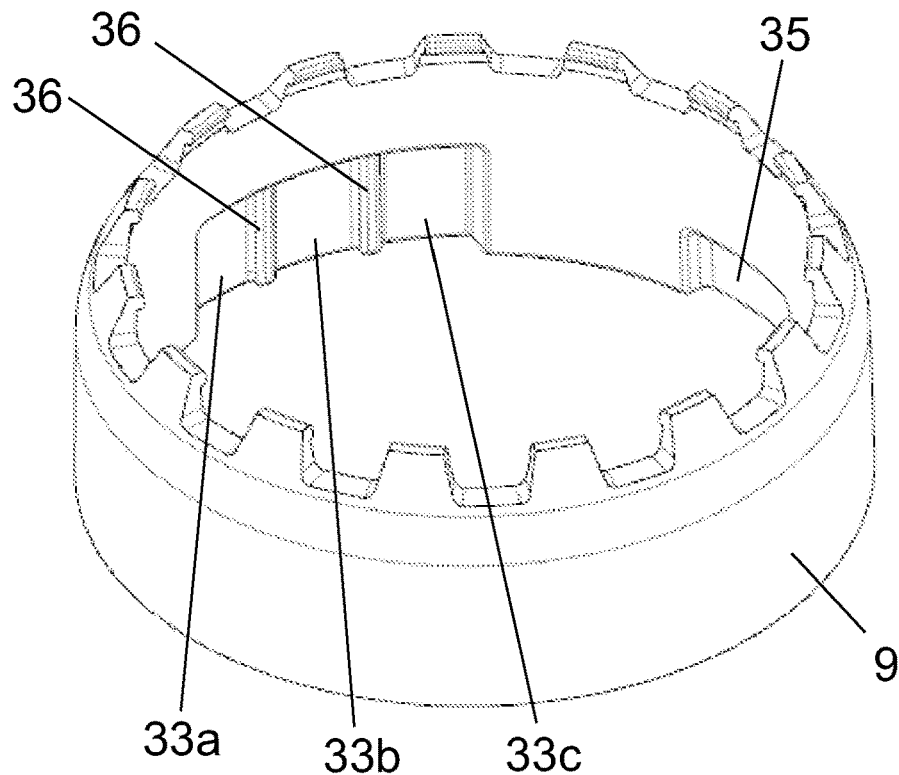
FIGS. 7a, 7b show perspective views of a further embodiment of an unlocking element.
Figure 7B:
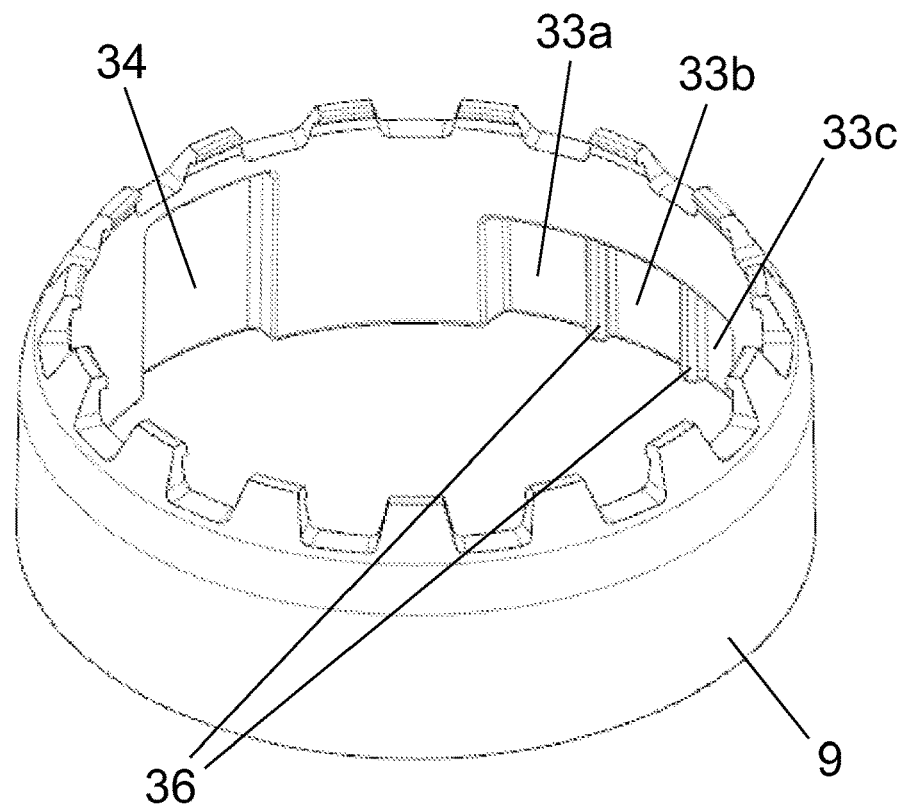

FIGS. 7a and 7b show perspective views of the unlocking element 9 from various angles. In that respect it is possible to see a recess subdivided into three portions 33a, 33b and 33c which are delimited from each other by intermediate bars 36. The portions 33a, 33b and 33c serve as latching positions for the actuating regions 4, 14 in the respective locking positions. In that case however it is not the actuating regions 4, 14 themselves that are arranged in the portions 33a, 33b or 33c, but the holding regions 3, 13, for example when—as shown in FIG. 6a—they are in the form of a common holding region in the shape of a tab. The portions however can also be of a different configuration to serve as a latching position for holding regions 3, 13 of a different configuration.

When both actuating regions 4, 14 are in the respective locking position the unlocking element 9 is arranged in such a way that the common holding region is arranged in the portion 33b. The intermediate bars 36 which are possibly of a resilient nature prevent the unlocking element 9 being inadvertently moved. That represents a further security feature of the present invention. The actuating region 4 of the thread insert 2 is disposed in the first guide recess 34, while the actuating region 14 of the second thread insert 12 is disposed in the second guide recess 35. As the actuating region 14 is disposed in the lower portion while the actuating region 4 is arranged in the upper portion the first guide recess 34 is of a greater axial extent than the second guide recess 35. As a result it is not possible for the actuating region 4 to be arranged in the second guide recess 35. The configuration of the first guide recess 34 and the second guide recess 35 as a result ensure the correct arrangement of the unlocking element 9.

Upon a rotation of the unlocking element 9 in a first direction of rotation the actuating region 4 is also moved by the edge of the first guide recess 34. At the same time the common holding region is moved into the first portion 33a. The intermediate bar 36 serving as a latching element prevents the unlocking element 9 from moving relative to the thread insert 2. As a result the actuating region 4 is held in that position in which rotation of the abutment element 1 is possible. The portion 33a thus defines a latching position for the actuating region 4 and there is no need to manually holding the unlocking element 9 in order to prevent the actuating region 4 being moved of its own accord into the locking position, by virtue of the spring action of the thread insert 2.

Upon a rotation of the illustrated unlocking element 9 in the other direction of rotation the second actuating region 14 is moved by the edge of the second guide recess 35, at the same time the common holding region is moved into the portion 33c and is held there by means of the intermediate bar 36. As a result the actuating region 14 is held in that position in which rotation of the abutment element 1 is possible. The portion 33c thus defines a latching position for the actuating region 14 of the second thread insert 12. The intermediate bar 36 prevents the locking element 9 being moved relative to the second thread insert 12 by the common holding region being moved into the portion 33b. That prevents the actuating region 14 of the second thread insert 12, that is moved away from its locking position, being moved of its own accord back into the locking position by virtue of the spring action.

Figure 8A:
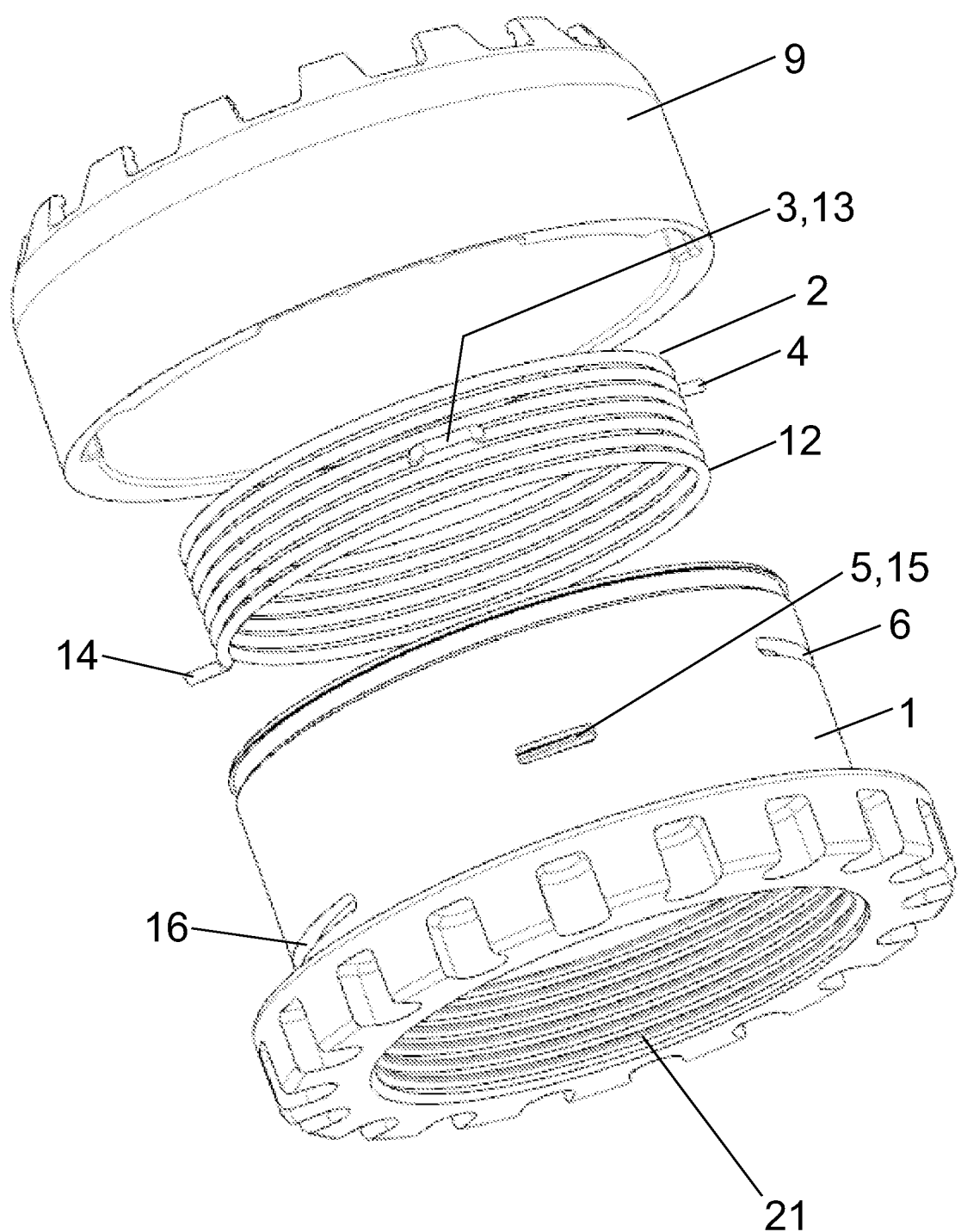
FIGS. 8a, 8b show an exploded view and a perspective view of the further embodiment of the abutment element with unlocking element.

The exploded view in FIG. 8a corresponds to that in FIG. 6a, with the unlocking element 9 shown in FIGS. 7a and 7b additionally being illustrated here.

Figure 8B:
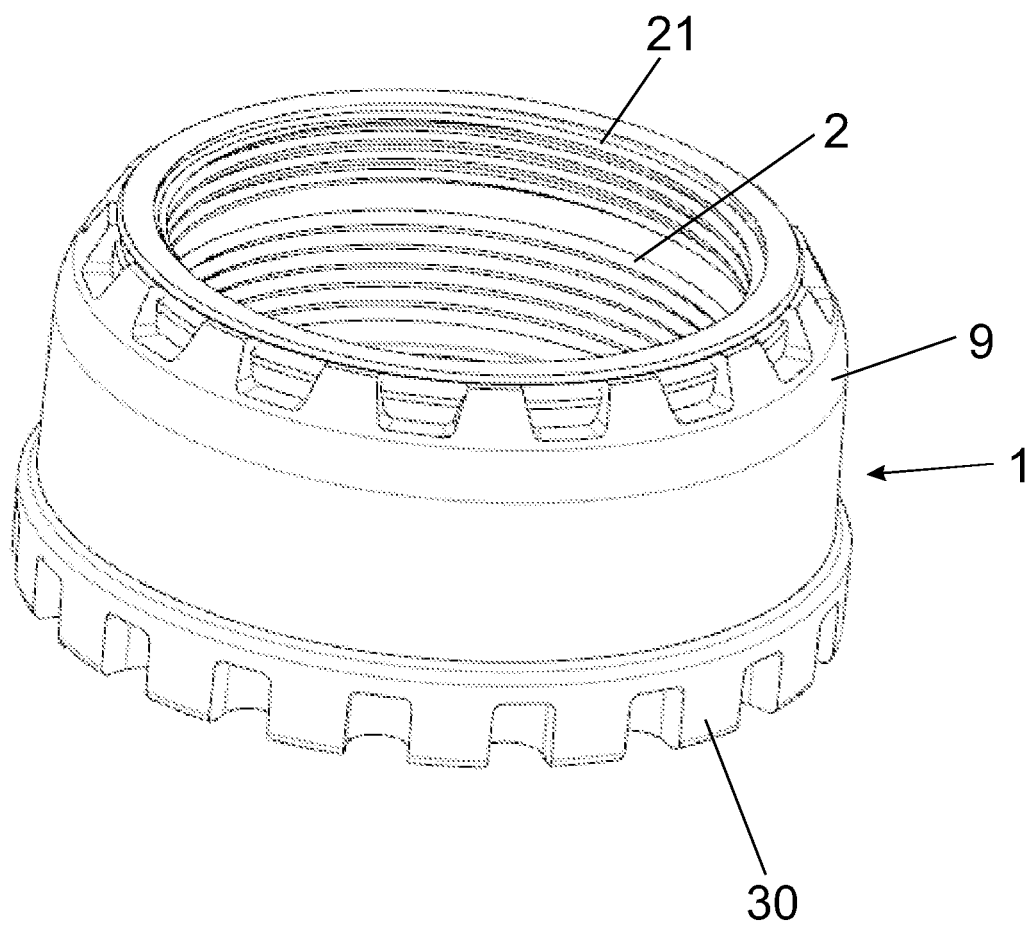

The perspective view in FIG. 8b corresponds to that of FIG. 6b, wherein the rotatably mounted unlocking element 9 shown in FIGS. 7a and 7b is additionally also arranged on the abutment element 1.

Figure 9A:
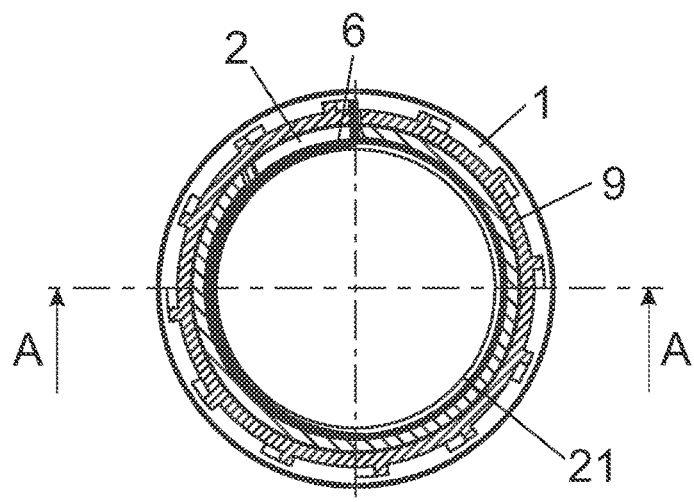
FIGS. 9a-9d show three cross-sectional views of a further embodiment of an abutment element according to the invention with unlocking element.
Figure 9B:
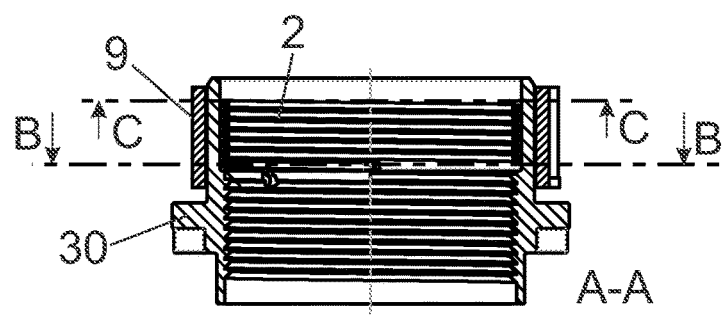
Figure 9C:
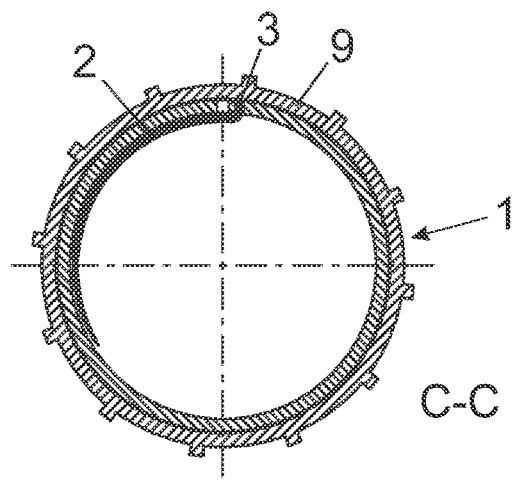
Figure 9D:
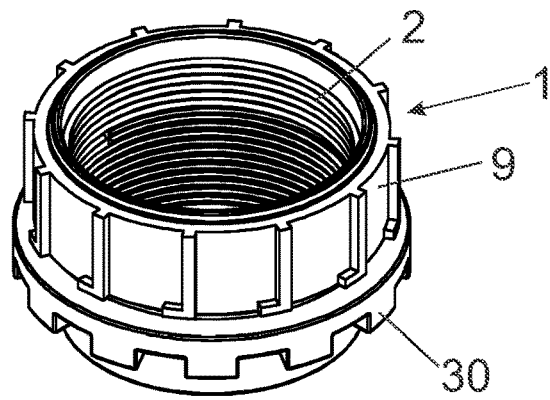

FIG. 9a shows a cross-sectional view of a further embodiment of the abutment element 1 of FIG. 9d, along the section line B-B shown in FIG. 7b. It can be seen in this case how the actuating region 4 of the thread insert 2 projects outwardly and is fixed by a recess in the unlocking element 9. The actuating region 4 can be moved in the slot 6 by a rotation of the unlocking element 9.

FIG. 9b shows a cross-sectional view along the section line A-A shown in FIG. 9a. In this embodiment of the invention only one region of the inside of the abutment element 1 is provided with a female thread 21.

FIG. 9c shows a cross-sectional view along section line C-C illustrated in FIG. 9b. It can be seen here how the holding region 3 of the thread insert 2 projects outwardly and is fixed in the holding means 5 in the form of a recess in the abutment element 1.

FIG. 9d shows a perspective view of the embodiment shown in FIGS. 9a to 9c of the abutment element 1. In this variant of the invention the abutment element has only one thread insert 2 so that rotation of the abutment element 1 can be blocked only in relation to one direction of rotation.

Figure 10A:
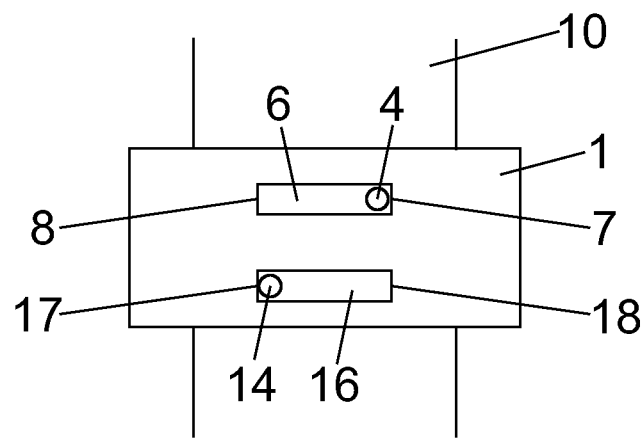
FIGS. 10a-10c show diagrammatic views of a mode of operation of the abutment element.

In the diagrammatic view in FIG. 10a the abutment element 1 is shown in the situation illustrated in FIG. 2, with the actuating region 4 being arranged in the region of the first end 7 of the slot 6, that is to say in the locking position. In this state rotation of the abutment element 1 in the clockwise direction is made impossible so that the abutment element 1 is secured against movement in the longitudinal direction L of the cylinder 10 in a downward direction. The actuating region 14 of the second thread insert 12 is disposed in the region of the first end 17 of the second slot 16, that is to say in the locking position. In this state rotation of the abutment element in the anti-clockwise direction is made impossible whereby the abutment element 1 is secured against movement in the longitudinal direction L of the cylinder 10 upwardly. Overall rotation of the abutment element 1 is made impossible in both directions of rotation.

Figure 10B:
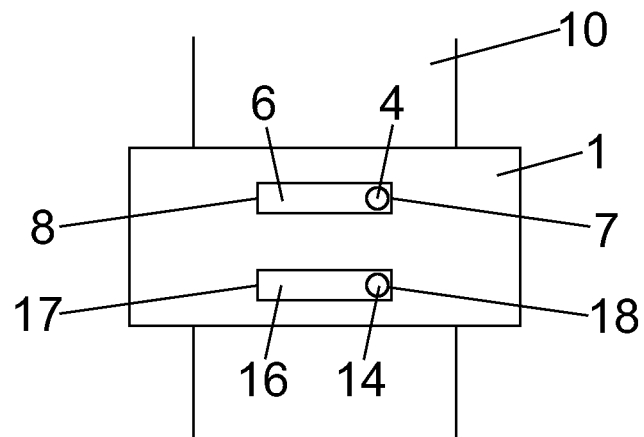

In FIG. 10b the actuating region 14 of the second thread insert 12 has been displaced in relation to the state shown in FIG. 10a out of the locking position to the other end 18 of the second slot 16. As a result rotation of the abutment element 1 in the anti-clockwise direction and thus a movement of the position of the abutment element 1 along the longitudinal direction L of the cylinder 10 upwardly is possible. In addition the abutment element 1 is secured against rotation of the abutment element 1 in the clockwise direction and thus a movement of the abutment element 1 along the longitudinal direction L downwardly.

Figure 10C:
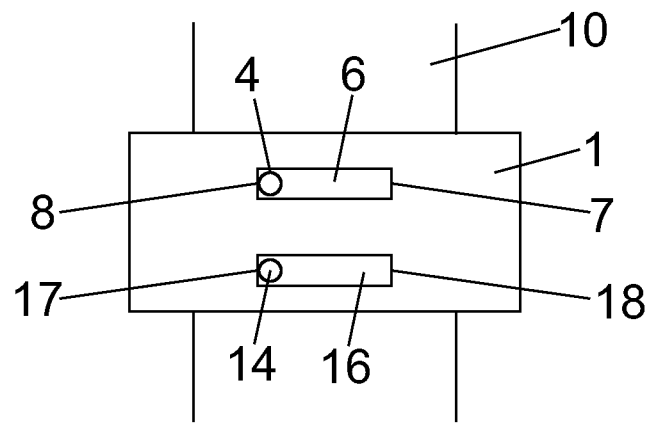

In FIG. 10c the actuating region 4 has been displaced in relation to the situation shown in FIG. 10a out of the locking position to the other end 8 of the slot 6. As a result rotation of the abutment element 1 in the clockwise direction and thus a movement of the abutment element 1 in the longitudinal direction L of the cylinder 10 downwardly is possible. Furthermore the abutment element 1 is secured against rotation of the abutment element 1 in the anti-clockwise direction and thus a movement of the abutment element 1 in the longitudinal direction L upwardly.

By virtue of a movement of the actuating region 4 or the actuating region 14 of the second thread insert 12 the operator can selectively increase or reduce the preload of the coil spring 11, for example to adapt the chassis to the weight of the rider.

LIST OF REFERENCES 1 abutment element
2 thread insert
3 holding region
4 actuating region
5 holding means
6 slot
7 first end of the slot
8 other end of the slot
9 unlocking element
10 cylinder
11 coil spring
12 second thread insert
13 holding region of the second thread insert
14 actuating region of the second thread insert
15 second holding means
16 second slot
17 first end of the second slot
18 other end of the second slot
19 piston
20 male thread
21 female thread
22 abutment ring
23 first groove
24 second groove
25 suspension strut
26 container for damping medium
27 second abutment element
28, 29 mountings for suspension strut
30 rotary region
31 region without female thread
32 motorcycle
33a, 33b, 33c latching positions for the holding regions
34 first guide recess
35 second guide recess
36 intermediate bars
L longitudinal direction of the cylinder

The invention claimed is:

1. A suspension strut for a vehicle, comprising:
a cylinder having a piston moveable in the cylinder;
a coil spring arranged at least partially around the cylinder; and
an abutment element for mounting the coil spring, a position of the abutment element being adjustably fixable along a longitudinal direction of the cylinder at least with respect to one direction,
wherein the cylinder includes a male thread, and the abutment element includes a female thread corresponding to the male thread,
wherein a first thread insert is arranged in the abutment element, the first thread insert having a holding region, an actuating region, and a region between the holding region and the actuating region which is arranged in threads of the male thread of the cylinder, and
wherein the abutment element includes a first opening which holds the holding region, the actuating region is mounted moveably in the abutment element, and a diameter of the first thread insert is variable by a movement of the actuating region.

2. The suspension strut according to claim 1, wherein the first thread insert has a resilient structure.

3. The suspension strut according to claim 1, wherein the first thread insert is a coil spring.

4. The suspension strut according to claim 1, wherein the abutment element has a slot in which the actuating region is moveably mounted.

5. The suspension strut according to claim 1, wherein the holding region or the actuating region is a radially outwardly pointing pin.

6. The suspension strut according to claim 5, wherein first opening is a bore or a recess into which the holding region is fixed.

7. The suspension strut according to claim 5, wherein the radially outwardly pointing pin is a radially outwardly bent spring end.

8. The suspension strut according to claim 4, wherein the first thread insert has a resilient structure and is arranged in the abutment element in such a way that the actuating region presses against a first end of the slot or the actuating region is arranged in a region of the first end of the slot in an absence of an external applied force.

9. The suspension strut according to claim 8, wherein upon a movement of the actuating region in a direction of a second end of the slot, the diameter of the first thread insert is increased, the first end and the second end being opposite ends of the slot.

10. The suspension strut according to claim 1, further comprising a second thread insert which is arranged in the abutment element, wherein the second thread insert has a holding region, an actuating region, and a region between the holding region of the second thread insert and the actuating region of the second thread insert which is arranged in the threads of the male thread of the cylinder, and
wherein the abutment element includes a second opening which holds the holding region of the second thread insert, wherein the actuating region of the second thread insert is mounted moveably in the abutment element, and wherein a diameter of the second thread insert is variable by a movement of the actuating region of the second thread insert.

11. The suspension strut according to claim 10, wherein the abutment element has a slot in which the actuating region of the second thread insert is moveably mounted.

12. The suspension strut according to claim 10, wherein the second thread insert has a resilient structure.

13. The suspension strut according to claim 12, wherein the second thread insert is a coil spring.

14. The suspension strut according to claim 1, wherein the actuating region is a first actuating region and the region between the holding region and the actuating region is a first region between the holding region and the first actuating region,
    wherein the first thread insert includes a second actuating region, the first and second actuating regions being on opposite sides of the holding region relative to an axial direction of the first thread insert,
    wherein the first thread insert includes a second region between the holding region and the second actuating region, the first and second regions being arranged in the threads of the male thread of the cylinder, and
    wherein the first and second actuating regions are mounted moveably in the abutment element, and the dismeter of the first thread insert is variable by a movement of the first actuating region or the second actuating region.

15. The suspension strut according to claim 10, wherein the holding region of the second thread insert or the actuating region of the second thread insert is a radially outwardly pointing pin.

16. The suspension strut according to claim 15, wherein the second opening is a bore or a recess into which the holding region of the second thread insert is fixed.

17. The suspension strut according to claim 15, wherein the radially outwardly pointing pin is a radially outwardly bent spring end.

18. The suspension strut according to claim 11, wherein the second thread insert has a resilient structure and is so arranged in the abutment element that the actuating region of the second thread insert presses against a first end of the slot or the actuating region of the second thread insert is arranged in a region of the first end of the slot in an absence of an external applied force.

19. The suspension strut according to claim 18, wherein upon a movement of the actuating region of the second thread insert in a direction of a second end of the slot, the diameter of the second thread insert is increased, the first end and the second end being opposite ends of the slot.

20. The suspension strut according to claim 19, wherein the direction in which the actuating region of the second thread insert is moveable to increase the diameter of the second thread insert is different from a direction in which the actuating region of the first thread insert is moveable for increasing the diameter of the first thread insert.

21. The suspension strut according to claim 10, wherein the abutment element has a first slot in which the actuating region of the first thread insert is moveably mounted and a second slot in which the actuating region of the second thread insert is moveably mounted, and wherein the first slot and the second slot are axially spaced from each other.

22. The suspension strut according to claim 21, wherein the first opening or the second opening is arranged between the first slot and the second slot in an axial direction of the abutment element.

23. The suspension strut according to claim 10, wherein an interior of the abutment element is free of a female thread in a region in which the first thread insert or the second thread insert is arranged.

24. The suspension strut according to claim 23, wherein the female thread of the abutment element is provided above and below the region that is free of the a female thread relative to an axial direction of the abutment element.

25. The suspension strut according to claim 10, further comprising an unlocking element which is arranged on an outside of the abutment element, and with which the actuating region of the first thread insert or the actuating region of the second thread insert is moveable.

26. The suspension strut according to claim 25, wherein the unlocking element on its inside has a first groove into which the actuating region of the first thread insert engages.

27. The suspension strut according to claim 26, wherein the unlocking element on its inside has a second groove into which the actuating region of the second thread insert engages.

28. The suspension strut according to claim 1, wherein an abutment ring is arranged between the abutment element and the coil spring which is arranged at least partially around the cylinder.

29. The suspension strut according to claim 18, wherein the abutment ring is a metallic abutment ring.

30. A vehicle comprising the suspension strut according to claim 1.

31. The suspension strut according to claim 1, wherein the suspension strut is a motocycle suspension strut.

32. An abutment element for mounting a coil spring which is arranged at least partially around a cylinder of a suspension strut, wherein the abutment element includes a female thread,
    wherein a first thread insert is arranged in the abutment element, the first thread insert having a holding region, an actuating region, and a region between the holding region and the actuating region, wherein the region between the holding region and the actuating region is configured to be arranged in threads of a male thread of the cylinder, and
    wherein the abutment element includes a first opening which holds the holding region, the actuating region is mounted moveably in the abutment element, and a diameter of the first thread insert is variable by a movement of the actuating region.

33. The abutment element according to claim 32, further comprising a second thread insert arranged in the abutment element,
    wherein the second thread insert has a holding region, an actuating region, and a region between the holding region and the actuating region, wherein the region between the holding region and the actuating region of the second thread insert is configured to be arranged in the threads of the male thread of the cylinder, and
    wherein the abutment element includes a second opening which holds the holding region of the second thread insert, wherein the actuating region of the second thread insert is mounted moveably in the abutment element, and wherein a diameter of the second thread insert is variable by a movement of the actuating region of the second thread insert.

\* \* \* \* \*